(12) United States Patent
Liao et al.

(10) Patent No.: US 11,280,932 B2
(45) Date of Patent: Mar. 22, 2022

(54) MAIN CONTROL SYSTEM AND A DEVICE FOR A NUCLEAR MAGNETIC RESONANCE LOGGING WHILE DRILLING TOOL

(71) Applicant: CHINA UNIVERSITY OF PETROLEUM—BEIJING, Beijing (CN)

(72) Inventors: Guangzhi Liao, Beijing (CN); Lizhi Xiao, Beijing (CN); Yangyang Xu, Beijing (CN); Wei Liu, Beijing (CN); Yao Wei, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 266 days.

(21) Appl. No.: 16/420,010

(22) Filed: May 22, 2019

(65) Prior Publication Data
US 2019/0361143 A1    Nov. 28, 2019

(30) Foreign Application Priority Data

May 23, 2018   (CN) .......................... 201810563528.8

(51) Int. Cl.
*G01V 3/32*    (2006.01)
*E21B 47/14*   (2006.01)
*E21B 49/00*   (2006.01)

(52) U.S. Cl.
CPC .............. *G01V 3/32* (2013.01); *E21B 47/14* (2013.01); *E21B 49/00* (2013.01)

(58) Field of Classification Search
CPC ............ G01V 3/32; E21B 47/14; E21B 49/00
(Continued)

(56) References Cited

U.S. PATENT DOCUMENTS

| 5,381,092 A * | 1/1995 | Freedman | G01V 3/32 |
| | | | 324/303 |
| 7,633,293 B2* | 12/2009 | Olson | G01R 33/246 |
| | | | 324/309 |

(Continued)

FOREIGN PATENT DOCUMENTS

| CN | 1560654 A | 1/2005 |
| CN | 2851573 Y | 12/2006 |

(Continued)

OTHER PUBLICATIONS

Yarman et al.; A new inversion method for NMR signal processing; Dec. 18, 2013; IEEE; 2013 5th IEEE International Workshop on Computational Advances in Multi-Sensor Adaptive Processing (Year: 2013).*

(Continued)

*Primary Examiner* — Judy Nguyen
*Assistant Examiner* — Rahul Maini
(74) *Attorney, Agent, or Firm* — J.C. Patents

(57) ABSTRACT

Provided are a main control system and a device for a nuclear magnetic resonance logging while drilling tool, the system includes: a digital signal processor, an auxiliary measurement module, a pulse signal generation module and a memory disposed in a downhole drilling tool; wherein the digital signal processor is communicatively connected to an upper computer arranged on the ground, the auxiliary measurement module and the pulse signal generation module respectively; the memory is communicatively connected to the pulse signal generation module. The main control system and a device for a nuclear magnetic resonance logging while drilling tool achieve the effect of improving the accuracy of the logging data.

12 Claims, 3 Drawing Sheets

Main control system for a nuclear magnetic resonance logging while drilling tool

(58) Field of Classification Search
USPC .......................................................... 324/303
See application file for complete search history.

(56) References Cited

U.S. PATENT DOCUMENTS

| | | | |
|---|---|---|---|
| 2002/0196018 A1 | 12/2002 | Wister | |
| 2015/0054503 A1* | 2/2015 | Chen ........................ | G01V 3/32 |
| | | | 324/303 |
| 2016/0258288 A1* | 9/2016 | Hay ......................... | G01V 3/28 |
| 2018/0284312 A1* | 10/2018 | Romero ................... | G01V 3/32 |

FOREIGN PATENT DOCUMENTS

| | | | | |
|---|---|---|---|---|
| CN | 104389585 | A | 3/2015 | |
| CN | 104481503 | A | 4/2015 | |
| CN | 106842286 | A | 6/2017 | |
| CN | 107102369 | A | 8/2017 | |
| CN | 107288624 | A * | 10/2017 | ............ E21B 47/14 |
| CN | 206920623 | U | 1/2018 | |
| CN | 101525998 | A | 5/2019 | |
| CN | 102881280 | A | 7/2019 | |
| WO | 2011/140214 | A2 | 11/2011 | |

OTHER PUBLICATIONS

Translation of CN107288624; Oct. 2017; Published by EPO (Year: 2017).*
Notice of Allowance of the priority CN application No. 201810563528.8.
The Chinese First Examination Report of corresponding Chinese application No. 201810563528.8, dated Jul. 15, 2019.
The Chinese Second Examination Report of corresponding Chinese application No. 201810563528.8, dated Dec. 26, 2019.

* cited by examiner

MAIN CONTROL SYSTEM AND A DEVICE FOR A NUCLEAR MAGNETIC RESONANCE LOGGING WHILE DRILLING TOOL

CROSS-REFERENCE TO RELATED APPLICATIONS

This application claims priority to Chinese Patent Application No. 201810563528.8, filed on May 23, 2018, which is hereby incorporated by reference in its entirety.

TECHNICAL FIELD

The disclosure relates to the field of petroleum exploration, in particular to a main control system and a device for a nuclear magnetic resonance logging while drilling tool.

BACKGROUND

In the exploration and development of oil and gas fields, logging is required after drilling, so that the staff can timely aware the oil and gas storage conditions in the underground for subsequent mining of the oilfield.

Existing nuclear magnetic resonance logging tools are generally transmitted by cable, that is, after the drilling is completed, the nuclear magnetic resonance logging tool is placed into the well through the cable to obtain the oil and gas storage data of the underground.

However, as the drilling fluid is circulated during the drilling process and the drilled cuttings are taken out, the drilling fluid filtrate always invades the formation. Therefore, after the drilling is completed, the logging is carried out by means of cable transmission, the various parameters of the formation are different from those of the newly drilled formation. Therefore, the measurement results are often inaccurate, which will bring inconvenience to the subsequent oilfield mining work.

SUMMARY

The disclosure provides a main control system and a device for a nuclear magnetic resonance logging while drilling tool, which is used for solving the defects that in the prior art the nuclear magnetic resonance logging tool generally adopts cable transmission for the logging and the measurement, and leading to an inaccurate result.

A first aspect of the present disclosure provides a main control system for a nuclear magnetic resonance logging while drilling tool, comprising: a digital signal processor, an auxiliary measurement module, a pulse signal generation module and a memory disposed in a downhole drilling tool; wherein the digital signal processor is communicatively connected to a upper computer disposed on the ground, the auxiliary measurement module, and the pulse signal generation module respectively, for receiving and parsing a control instruction sent by the upper computer, and controlling the auxiliary measurement module to complete an auxiliary measurement according to the control instruction, and controlling the pulse signal generation module to transmit a pulse signal according to the control instruction;

the memory is communicatively connected to the pulse signal generation module, and the pulse signal generation module is further configured to collect an echo signal generated by a pulse signal excitation in the underground formation, and send the echo signal to the memory for storage;

the digital signal processor is further configured to acquire the echo signal from the memory according to a signal acquisition instruction sent by the upper computer and return to the upper computer.

Further, the main control system for a nuclear magnetic resonance logging while drilling tool further includes a digital signal frequency generator;

the digital signal frequency generator is communicatively connected to the pulse signal generation module, the auxiliary measurement module, and the digital signal processor, respectively, for providing a uniform clock signal for the pulse signal generation module, the auxiliary measurement module, and the number signal processor.

Further, the pulse signal generation module includes a first signal processing module for isolating, bleeding, attenuating, and scale processing the pulse signal.

Further, the pulse signal generation module further includes a second signal processing module, configured to temporarily store the echo signal and process the echo signal by a digital phase sensitive detection algorithm.

Further, the digital signal processor includes a third signal processing module for performing data inversion and data compression processing on the echo signal.

Further, the digital signal processor further includes a communication module;

the communication module is communicatively connected to the third signal processing module and the upper computer respectively, and is configured to send the echo signal after being subjected to the data inversion and data compression processing of the third signal processing module to the upper computer.

Further, the upper computer and the digital signal processor are communicatively connected through an Rs485 serial bus.

Further, the control instruction includes a pulse sequence parameter and an isolation control signal, a bleed control signal, an attenuation control signal, and a scale control signal, and the pulse sequence parameter is configured to control the pulse signal generation module to transmit a pulse signal corresponding to the pulse sequence parameter;

the isolation control signal, the bleed control signal, the attenuation control signal, and the scale control signal are respectively used to control the first signal processing module to isolate, bleed, attenuate, and scale the pulse signal.

further, the auxiliary measurement includes an acceleration measurement, a well inclination measurement, and an angle measurement;

the auxiliary measurement module is further configured to send auxiliary measurement data to the digital signal processor in real time, so that the digital signal processor returns the auxiliary measurement data to the upper computer.

Another aspect of the present disclosure provides a nuclear magnetic resonance logging while drilling apparatus, comprising: a downhole drilling tool and an uphole data processing device;

the downhole drilling tool is provided with the above-mentioned main control system for a nuclear magnetic resonance logging while drilling tool;

the uphole data processing device is an upper computer disposed on the ground.

The main control system and the device for a nuclear magnetic resonance logging while drilling tool provided by the disclosure comprises a digital signal processor, an auxiliary measurement module, a pulse signal generation module and a memory disposed in a downhole drilling tool, and the digital signal processor receives the control instruction sent by the upper computer disposed on the ground, controls the auxiliary measurement module to complete the auxiliary measurement according to the control instruction, controls the pulse signal generation module to transmit the pulse signal, and receives the echo signal generated by the excitation of the pulse signal in the underground formation and sends the echo signal to the memory for storing, so that the memory returns the echo signal to the upper computer. Since the main control system of the nuclear magnetic resonance logging while drilling tool can go deep into the ground along with the drilling tool, the formation parameters obtained by the main control system of the nuclear magnetic resonance logging while drilling tool are the parameters of the newly drilled formation, which is closest to the original state of the formation, and the measurement results are more accurate.

BRIEF DESCRIPTION OF THE DRAWINGS

In order to more clearly illustrate the embodiments of the present disclosure or the technical solutions in the prior art, the drawings used in the embodiments or the description of the prior art will be briefly described below. Obviously, the drawings in the following description are some of the embodiments of the present disclosure and other figures may also be derived by those skilled in the art in accordance with the drawings.

REFERENCE MARK

1—upper computer; 2—digital signal processor; 3—auxiliary measurement module; 4—pulse signal generation module; 5—memory; 6—master control system for nuclear magnetic resonance logging while drilling tool; 7—digital signal frequency generator; 8—downhole drilling tool; 9—uphole data processing equipment; 10—nuclear magnetic resonance logging while drilling device.

DETAILED DESCRIPTION OF THE EMBODIMENTS

In order to make the objectives, technical solutions, and advantages of the present disclosure more comprehensible, the technical solutions according to embodiments of the present disclosure are clearly and completely described in the following with reference to the accompanying drawings. Apparently, the embodiments in the following description are merely a part rather than all of the embodiments of the present disclosure. All other embodiments obtained based on the embodiments of the present disclosure shall fall within the protection scope of the present disclosure.

Figure 1:
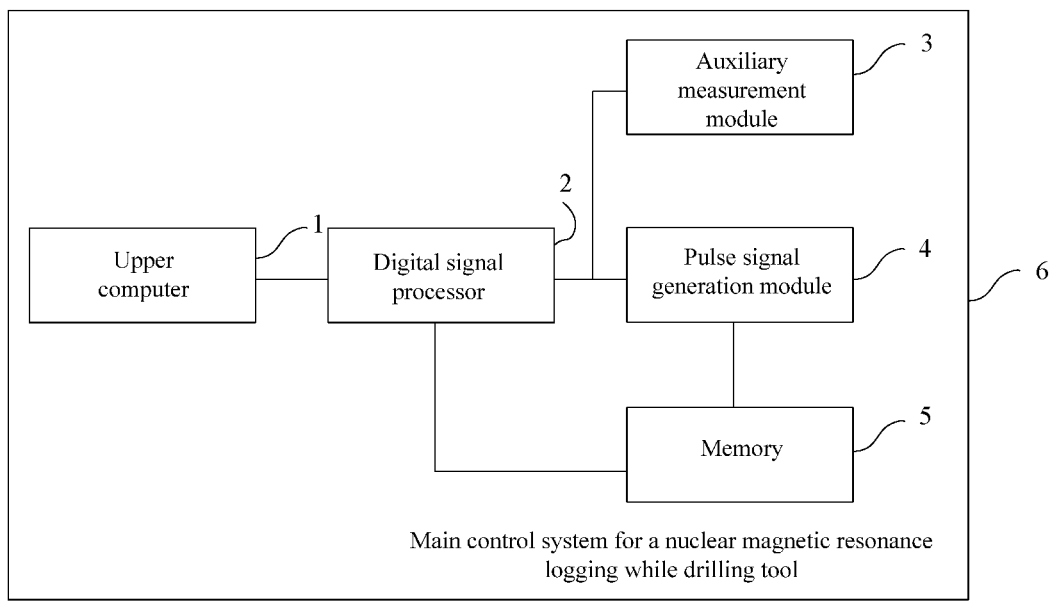
FIG. 1 is a schematic structural diagram of a main control system for a nuclear magnetic resonance logging while drilling tool according to an embodiment of the present disclosure.
Figure 2:
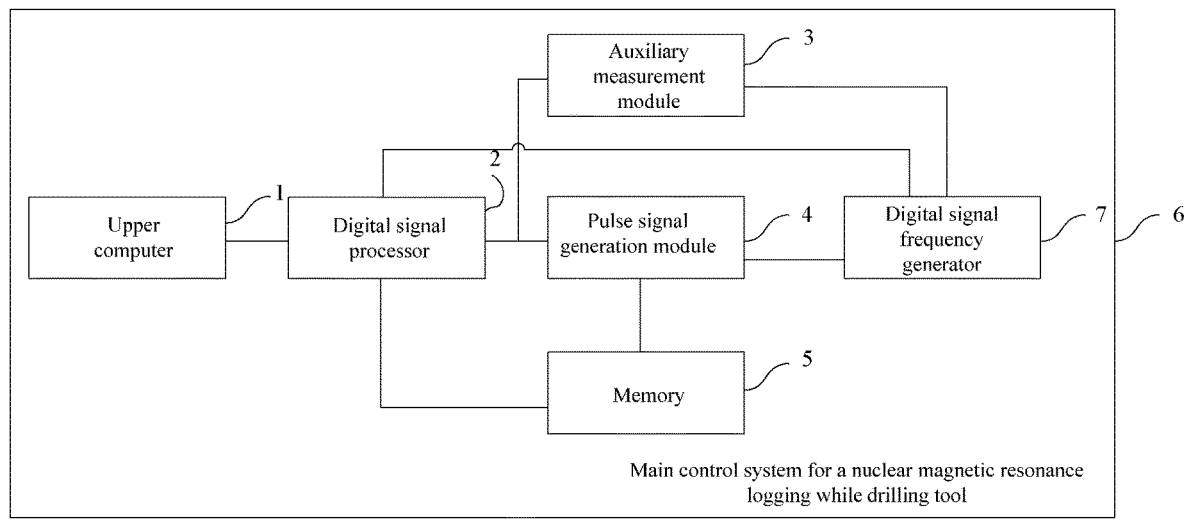
FIG. 2 is a schematic structural diagram of a main control system for a nuclear magnetic resonance logging while drilling tool according to another embodiment of the present disclosure.

FIG. 1 is a schematic structural diagram of a main control system for a nuclear magnetic resonance logging while drilling tool according to an embodiment of the present disclosure; FIG. 2 is a schematic structural diagram of a main control system for a nuclear magnetic resonance logging while drilling tool according to another embodiment of the present disclosure; as shown in FIG. 1 to FIG. 2, the main control system of the nuclear magnetic resonance logging while drilling tool includes: a digital signal processor, an auxiliary measurement module, a pulse signal generation module and a memory disposed in a downhole drilling tool; wherein the digital signal processor is communicatively connected to a upper computer disposed on the ground, an auxiliary measurement module, and a pulse signal generation module respectively, for receiving and parsing a control instruction sent by the upper computer, and controlling the auxiliary measurement to complete the auxiliary measurement according to the control instruction, and controlling the pulse signal generation module to transmit a pulse signal according to the control instruction;

the memory is communicatively connected to the pulse signal generation module, and the pulse signal generation module is further configured to collect an echo signal generated by a pulse signal excitation in the underground formation, and send the echo signal to the memory for storage;

the digital signal processor is further configured to acquire the echo signal from the memory according to a signal acquisition instruction sent by the upper computer and return to the upper computer.

In this embodiment, the main control system for nuclear magnetic resonance logging while drilling tool 6 is provided with a digital signal processor 2, an auxiliary measurement module 3 and a pulse signal generation module 4 disposed in a downhole drilling tool 8, and the digital signal processor 2 communicatively connected to an upper computer 1 disposed on the ground, the auxiliary measurement module 3, and the pulse signal generation module 4 respectively, wherein the upper computer 1 is configured to complete human-computer interaction, and can accept the user's control instruction and the echo signal acquisition command, and send the control instruction to the digital signal processor 2. The digital signal processor 2 is configured to parse the control instruction into a statement that the auxiliary measurement module 3 and the pulse signal generation module 4 can recognize, and forward the parsed control instruction to the auxiliary measurement module 3 and the pulse signal generation module 4 to make the auxiliary measuring module 3 completes the auxiliary measuring portion according to the control instruction, and causes the pulse signal generation module 4 to transmit the pulse signal according to the control instruction.

It should be noted that, on the basis of the foregoing embodiment, the control instruction includes a pulse sequence parameter, and the pulse sequence parameter is used to control the pulse signal generation module 4 to transmit a pulse signal corresponding to the pulse sequence parameter.

Specifically, the control instruction includes a pulse sequence parameter, and the pulse sequence parameter includes, but is not limited to, parameters such as pulse width, pulse length, and echo number to be set to control the magnetic field strength. The digital signal processor 2 can parse the control instruction into a statement that the auxiliary measurement module 3 and the pulse signal generation module 4 can recognize, so that the pulse signal generation module 4 transmits pulse signal corresponds to the pulse sequence parameter according to the pulse sequence parameter included in the control instruction, in particular, the parameters such as pulse width, pulse length and number of echoes can be set by the user.

After the pulse signal generation module 4 transmits the pulse signal, the underground geological structure generates an echo signal according to the pulse signal, and the pulse signal generation module 4 can also be used to collect the echo signal generated by the geological structure. In addition, the main control system for nuclear magnetic resonance logging while drilling tool 6 further includes a memory 5, which is communicatively connected to the pulse signal generation module 4 and the digital signal processor 2 respectively, and after the pulse signal generation module 4 collects the echo signal, stores the echo signal in the memory 5 and waits for the user's retrieval. The upper computer 1 can also receive a signal acquisition instruction sent by the user, and send the signal acquisition instruction to the digital signal processor 2, the digital signal processor 2 parses the signal acquisition instruction, and acquires an echo signal from the memory 5 according to the signal acquisition instruction, and return the echo signal to the upper computer 1 for the user to view.

It should be noted that the memory 5 is a flash memory. Both the auxiliary measurement module 3 and the pulse signal generation module 4 can be implemented by a Field-Programmable Gate Array (FPGA). As an implementable manner, the above two modules can also be implemented by other hardware. It is not limited in the disclosure herein.

As an implementable manner, on the one hand, the memory 5 can transmit the echo signal to the digital signal processor 2 according to the signal acquisition instruction sent by the digital signal processor 2, and on the other hand, the main control system for a nuclear magnetic resonance logging while drilling tool 6 can also be provided with a digital signal frequency generator 7 communicatively connected to the memory 5, so that the memory 5 can periodically transmit its stored echo signal to the digital signal processor 2 so that the digital signal processor 2 return the echo signal to the upper computer 1 for the view of user, and the downhole condition can be accurately understood. Furthermore, in order to further improve the accuracy of the acquired echo signal, the digital signal frequency generator 7 communicatively connected to the memory 5 can provide a clock signal to the memory 5 so that the memory 5 can associate its own stored echo signal with the current time for storage, so that the correlation between the echo signal and the well depth can be improved, and it is convenient for the user to perform subsequent processing on the echo signal.

The main control system for the nuclear magnetic resonance logging while drilling tool provided by the embodiment includes a digital signal processor, an auxiliary measurement module, a pulse signal generation module and a memory disposed in a downhole drilling tool, and the digital signal processor receives the control instruction sent by the upper computer disposed on the ground, controls the auxiliary measurement module to complete the auxiliary measurement according to the control instruction, and controls the pulse signal generation module to transmit the pulse signal, and receives the echo signal generated by the underground geological structure according to the pulse signal and sends the echo signal to the memory, so that the memory returns the echo signal to the upper computer. Since the main control system of the nuclear magnetic resonance logging while drilling tool can go deep into the ground along with the drilling instrument, the formation parameters obtained by the main control system of the nuclear magnetic resonance logging while drilling tool are the parameters of the newly drilled formation, which is closest to the original state of the formation, and the measurement results are more accurate.

Further, based on any of the above embodiments, the main control system for the nuclear magnetic resonance logging while drilling tool further comprises a digital signal frequency generator;

The digital signal frequency generator is communicatively connected to the pulse signal generation module, the auxiliary measurement module, and the digital signal processor, respectively, for providing a uniform clock signal for the pulse signal generation module, the auxiliary measurement module, and the digital signal processor.

In order to complete the analysis and interpretation of the underlying geological conditions, the measurement data needs to exactly correspond to the well depth, thus an accurate clock signal is required. Therefore, the digital signal frequency generator is communicatively connected to the pulse signal generation module, the auxiliary measurement module, and the digital signal processor, respectively, thus can provide a unified clock signal for the pulse signal generation module, the auxiliary measurement module and the digital signal processor, thereby enabling the pulse signal generation module 4 to transmit the pulse signal according to the clock signal, thereby improving the correlation between the echo signal and the well depth.

The main control system for the nuclear magnetic resonance logging while drilling tool provided by the embodiment provides a digital signal frequency generator communicatively connected to the pulse signal generation module, thereby enabling the pulse signal generation module to transmit a pulse signal according to the clock signal, thereby improving the degree of correlation of the echo signal and the depth of the well, and further improve the measurement accuracy of the underground geological structure.

Further, based on any of the above embodiments, the pulse signal generation module includes a first signal processing module for isolating, bleed, attenuate, and scale processing the pulse signal.

In this embodiment, the pulse signal generation module 4 further includes a first signal processing module for isolating, bleed, attenuate, and scale processing the pulse signal. In the nuclear magnetic resonance logging instrument, if the recovery time of the antenna is too long, and the echo signal collection will be interfered, so the bleeder circuit is used to perform rapid discharge of the antenna energy. The transmission of the radio frequency pulse and the reception of the echo signal use the same antenna. When the pulse is transmitted, the voltage across the antenna is very high (several hundred volts to several kilovolts), and the amplitude of the echo signal is very small (tens of nanovolts to tens of microvolts), so isolation protection is required between the receiving circuit and the antenna. Therefore, in order to improve the accuracy of the collected echo signals, the first signal processing module can isolate, bleed and attenuate the pulse signals that have been transmitted. It should be noted that in order to improve the accuracy of logging, the scale control signal can be first transmitted to test the accuracy of the main control system of the nuclear magnetic resonance logging while drilling tool before the formal test, so that it can be adjusted at any time.

The main control system of the nuclear magnetic resonance logging while drilling tool according to the embodiment provides the first signal processing module in the pulse signal generation module to isolate, bleed, attenuate and scale the pulse signal, thereby improving the accuracy of the acquired echo signal.

Further, based on any of the above embodiments, the control instruction includes a pulse sequence parameter and an isolation control signal, a bleed control signal, an attenuation control signal, and a scale control signal, wherein the pulse sequence parameter is used to control the pulse signal generation module transmits a pulse signal corresponding to the pulse sequence parameter;

The isolation control signal, the bleed control signal, the attenuation control signal, and the scale control signal are respectively used to control the first signal processing module to isolate, bleed, attenuate, and scale the pulse signal.

In this embodiment, in addition to the pulse sequence parameter, the control instruction includes an isolation control signal, a bleed control signal, an attenuation control signal, and a scale control signal, the isolation control signal, the bleed control signal, the attenuation control signal, and the scale control signal are used to control the first signal processing module to isolate, bleed, attenuate and scale the pulse signal. Thereby providing a basis for the processing of the signal by the first signal processing module.

Further, based on any of the foregoing embodiments, the pulse signal generation module 4 further includes a second signal processing module, configured to temporarily store the echo signal, and use the digital phase sensitive detection algorithm to perform the processing of the echo signal.

In this embodiment, the pulse signal generation module 4 further includes a second signal processing module for temporarily storing the echo signal and processing the echo signal by a digital phase sensitive detection algorithm. Specifically, the pulse signal generation module 4 is further provided with a second signal processing module for performing digital phase sensitive detection algorithm processing on the collected echo signals, thereby reducing the noise of the collected echo signals and improving the signal noise ratio. In addition, since the collected echo signals cannot be processed in time by the digital phase sensitive detection algorithm, the first input first output (FIFO) in the second signal processing module temporarily stores the collected echo signals.

The main control system of the nuclear magnetic resonance logging while drilling tool according to the embodiment provides a second signal processing module in the pulse signal generation module, thereby reducing the noise of the collected echo signal and improving the signal noise ratio.

Further, based on any of the above embodiments, the digital signal processor 2 includes a third signal processing module for performing data inversion and data compression processing on the echo signal.

In this embodiment, since the echo signal collected by the main control system for a nuclear magnetic resonance logging while drilling tool 6 needs to be uploaded to the upper computer 1, the logging while drilling generally uses the mud pulse generator to upload the data to the ground, and the data upload rate is generally about 10 bit/s. Therefore, in the nuclear magnetic resonance logging while drilling, the data upload rate often cannot upload the real-time echo signal to the ground, therefore, after the digital signal processor 2 acquires echo signal from the memory 5 according to the user's signal acquiring instruction, the signal needs to be subjected to a data inversion processing. In addition, after performing data inversion processing on the echo signal, in order to further improve data uploading efficiency, data compression can also be performed.

The main control system of a nuclear magnetic resonance logging while drilling tool according to the embodiment provides a third signal processing module in the digital signal processor for performing data inversion and data compression processing on the echo signal obtained from the memory. Thereby, the amount of data uploading can be greatly reduced, and the logging efficiency can be improved.

Further, based on any of the above embodiments, the digital signal processor 2 further includes a communication module;

the communication module is communicatively connected to the third signal processing module and the upper computer 1 respectively for transmitting an echo signal after being subjected to the data inversion and data compression processing of the third signal processing module to the upper computer 1.

In the embodiment, the digital signal processor 2 is further provided with a communication module, which is communicatively connected to the upper computer 1 and the third signal processing module respectively, and the digital signal processor 2 acquires the echo signal from the memory 5 according to the signal acquiring instruction of the user and performs data inversion and data compression processing, the echo signal after being subjected to the data inversion and data compression processing of the third signal processing module is transmitted to the upper computer 1 through the communication module, so that the user can perform subsequent analysis processing on the echo signal.

The main control system of a nuclear magnetic resonance logging while drilling tool according to the embodiment provides a communication module in the digital signal processor, so that the collected echo signal can be uploaded to the upper computer, so that the user can perform subsequent processing on the echo signal.

Further, based on any of the above embodiments, the upper computer 1 and the digital signal processor 2 are communicatively connected through an Rs485 serial bus.

In this embodiment, the upper computer 1 and the digital signal processor 2 are communicably connected by Rs485, RS485 adopts differential signal negative logic, +2V~+6V means "0", −6V~−2V means "1", and point-to-point communication can be realized. Therefore, the stability is good in the data transmission process, and the transmission efficiency is high.

Further, based on any of the above embodiments, the auxiliary measurement comprises an acceleration measurement, a well inclination measurement, and an angle measurement;

The auxiliary measurement module 3 is further configured to send auxiliary measurement data to the digital signal processor 2 in real time, so that the digital signal processor 2 returns the auxiliary measurement data to the upper computer 1.

In this embodiment, the auxiliary measurement module 3 completes the auxiliary measurement portion according to the control instruction. Specifically, the auxiliary measurement portion includes, but is not limited to, an acceleration measurement, a well inclination measurement, and an angle measurement. In the actual logging process, the deviation of the drilling instrument acceleration, the deviation of the well and the deviation of the angle will all affect the measurement results. Therefore, in order to improve the measurement accuracy, the acceleration measurement, the inclination measurement and the angle measurement can be completed by the auxiliary measurement module 3. Further, when the auxiliary measurement module 3 performs acceleration measurement, well inclination measurement, and angle measurement, the auxiliary measurement data may be sent to the digital signal processor 2 in real time, so that the digital signal processor 2 return the auxiliary measurement data to the upper machine 1 after the auxiliary measurement data is compressed by the digital signal processor 2, to achieve the current drilling acceleration, well inclination and angle adjustment. It should be noted that after receiving the auxiliary measurement data, the upper computer 1 can determine whether the current auxiliary measurement data is within a preset range according to the pre-stored standard acceleration, well deviation and angle standard data, and if so, determine the drilling parameters of the current downhole drilling tool 8 do not need to be adjusted. If not, the upper computer 1 can automatically adjust the current drilling parameters according to preset standard data, as an implementable way, after receiving the auxiliary measurement data, it can also be determined by the user whether the current auxiliary measurement parameter is within a preset standard range. If not, receiving the user's measurement parameter setting instruction, and the user-set measurement parameter is used as the current measurement parameter for adjusting the acceleration and well inclination and angle of the downhole drilling tool 8.

The main control system of a nuclear magnetic resonance logging while drilling tool provided by the embodiment completes the acceleration measurement, the well inclination measurement and the angle measurement through the auxiliary measurement module, and sends the auxiliary measurement data to the digital signal processor in real time, so that the digital signal processor returns the auxiliary measurement data after being compressed to the upper computer, thereby realizing the adjustment of the current drilling acceleration, the inclination and the angle, and improving the measurement accuracy.

In addition, the main control system for a nuclear magnetic resonance logging while drilling tool 6 is also provided with a battery for supplying power to each part of the main control system for a nuclear magnetic resonance logging while drilling tool 6.

Figure 3:
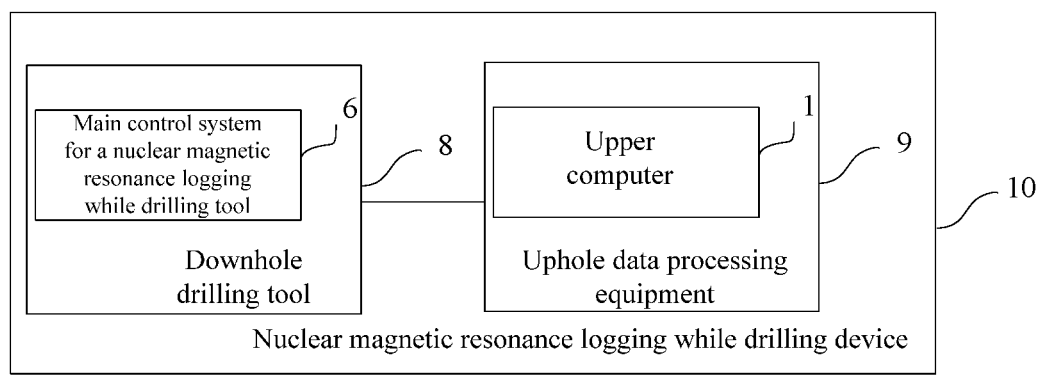
FIG. 3 is a schematic structural diagram of a nuclear magnetic resonance logging while drilling device according to another embodiment of the present disclosure.

FIG. 3 is a schematic structural diagram of a nuclear magnetic resonance logging while drilling device 10 according to another embodiment of the present disclosure. As shown in FIG. 3, the nuclear magnetic resonance logging while drilling device 10 includes a downhole drilling tool 8 and an uphole data processing device 9.

The downhole drilling tool 8 is provided with the main control system for a nuclear magnetic resonance logging while drilling tool 6 as described in any of the above embodiments;

The uphole data processing device 9 is the upper computer 1 disposed on the ground.

In the present embodiment, the nuclear magnetic resonance logging while drilling device 10 includes a downhole drilling tool 8 and an uphole data processing device 9; the downhole drilling tool 8 is provided with a main control system for a nuclear magnetic resonance logging while drilling tool 6 as described in any of the above embodiments; the uphole data processing device 9 is an upper computer 1 disposed on the ground. Specifically, the main control system for a nuclear magnetic resonance logging while drilling tool 6 is provided with a digital signal processor 2, an auxiliary measurement module 3 and a pulse signal generation module 4 disposed in the downhole drilling tool 8, and the digital signal processor 2 are communicatively connected to the upper computer 1 disposed on the ground, the auxiliary measurement module 3 and the pulse signal generation module 4 respectively, wherein the upper computer 1 is used for completing human-computer interaction, and can accept the user's control instruction and echo signal acquisition instruction, and send the control instruction to the digital signal processor 2. The digital signal processor 2 is configured to parse the control instruction into a statement that the auxiliary measurement module 3 and the pulse signal generation module 4 can recognize, and forward the parsed control instruction to the auxiliary measurement module 3 and the pulse signal generation module 4 to enable the auxiliary measurement module 3 completes the auxiliary measurement portion according to the control instruction, and causes the pulse signal generation module 4 to transmit pulse signal according to the control instruction.

It should be noted that, on the basis of the above embodiment, the control instruction includes a pulse sequence parameter, and the pulse sequence parameter is used to control the pulse signal generation module 4 to transmit a pulse signal corresponding to the pulse sequence parameter.

Specifically, the control instruction includes a pulse sequence parameter, the pulse sequence parameter including, but not limited to, a pulse width, a pulse length, and a control magnetic field strength to be set. The digital signal processor 2 can parse the control instruction into a statement that the auxiliary measurement module 3 and the pulse signal generation module 4 can recognize, so that the pulse signal generation module 4 transmits pulse signal corresponding to the pulse sequence parameter according to the pulse sequence parameter included in the control instruction.

After the pulse signal generation module 4 transmits the pulse signal, the underground geological structure generates an echo signal according to the pulse signal, and the pulse signal generation module 4 can also be used to collect the echo signal generated by the geological structure. In addition, the main control system for a nuclear magnetic resonance logging while drilling tool 6 further includes a memory 5, which is communicatively connected to the pulse signal generation module 4 and the digital signal processor 2 respectively, and after the pulse signal generation module 4 collects the echo signal, the echo signal is stored in the memory 5 and waiting for the user's retrieval. The upper computer 1 can also receive a signal acquisition instruction sent by the user, and send the signal acquisition instruction to the digital signal processor 2, the digital signal processor 2 parses the signal acquisition instruction, and acquires an echo signal from the memory 5 according to the signal acquisition instruction and return the echo signal to the upper computer 1 for the user to view.

The nuclear magnetic resonance logging while drilling device according to the embodiment provides a downhole drilling tool and an uphole signal processing device, and the main control system of a nuclear magnetic resonance logging while drilling tool can be drilled into the ground together with the downhole drilling tool. The formation parameters obtained by the main control system of a nuclear magnetic resonance logging while drilling tool are the parameters of the formation that have just been drilled. It is closest to the original state of the formation, and the measurement results are more accurate.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A main control system for a nuclear magnetic resonance logging while drilling tool, comprising: a digital signal processor and a memory disposed in a downhole drilling tool; wherein the digital signal processor is communicatively connected to an upper computer disposed on the ground, and receives and parses a control instruction sent by the upper computer, causes an auxiliary measurement to be completed by the auxiliary measurement module according to the control instruction, and causes a pulse signal to be transmitted by a pulse signal generation module according to the control instruction;

the memory is communicatively connected to the digital signal processor, and the digital signal processor further causes the pulse signal generation module to collect an echo signal generated by the pulse signal in the underground formation, and send the echo signal to the memory and store it in the memory; and the digital signal processor is further caused to acquire the echo signal from the memory according to a signal acquisition instruction sent by the upper computer, process and compress the echo signal, and return the processed and compressed echo signal to the upper computer;

wherein a transmission of the pulse signal and a reception of the echo signal use a single antenna, and the pulse signal generation module is further caused to isolate, bleed, attenuate, and scale process the pulse signal, wherein a bleeder circuit is used to perform rapid discharge of antenna energy and a scale control signal is first transmitted to test an accuracy of the main control system of the nuclear magnetic resonance logging while drilling tool before a formal test.

2. The main control system for a nuclear magnetic resonance logging while drilling tool according to claim 1, wherein the main control system for a nuclear magnetic resonance logging while drilling tool further comprises a digital signal frequency generator;

the digital signal frequency generator is communicatively connected to the digital signal processor for providing a uniform clock signal for the digital signal processor.

3. The main control system for a nuclear magnetic resonance logging while drilling tool according to claim 1, wherein the digital signal processor is further caused to temporarily store the echo signal and process the echo signal by a digital phase sensitive detection algorithm.

4. The main control system for a nuclear magnetic resonance logging while drilling tool according to claim 1, wherein the digital signal processor is further caused to perform data inversion and data compression processing on the echo signal.

5. The main control system for a nuclear magnetic resonance logging while drilling tool according to claim 4, wherein the digital signal processor is further caused to:

communicatively connect to the upper computer, and send the echo signal that has been subjected to the data inversion and data compression processing by the digital signal processor to the upper computer.

6. The main control system for a nuclear magnetic resonance logging while drilling tool according to claim 1, wherein the upper computer and the digital signal processor are communicatively connected through an Rs485 serial bus.

7. The main control system for a nuclear magnetic resonance logging while drilling tool according to claim 1, wherein the control instruction comprises a pulse sequence parameter, an isolation control signal, a bleed control signal, an attenuation control signal, and a scale control signal, wherein the pulse sequence parameter is configured to control the digital signal processor to cause the pulse signal generation module to transmit the pulse signal according to the pulse sequence parameter;

the isolation control signal, the bleed control signal, the attenuation control signal, and the scale control signal are used to control the digital signal processor to cause the pulse signal generation module to isolate, bleed, attenuate, and scale process the pulse signal, respectively.

8. The main control system for a nuclear magnetic resonance logging while drilling tool according to claim 1, wherein the auxiliary measurement comprises an acceleration measurement, a well inclination measurement, and an angle measurement;

wherein auxiliary measurement data is sent to the digital signal processor in real time, so that the digital signal processor returns the auxiliary measurement data to the upper computer.

9. A nuclear magnetic resonance logging while drilling device, comprising: the downhole drilling tool and an uphole data processing device;

the downhole drilling tool is provided with the main control system for the nuclear magnetic resonance logging while drilling tool according to claim 1;

the uphole data processing device is the upper computer disposed on the ground.

10. The main control system for a nuclear magnetic resonance logging while drilling tool according to claim 2, wherein the digital signal processor further causes the pulse signal generation module to transmit the pulse signal according to the uniform clock signal to improve a correction correlation between the echo signal and a well depth, and the digital signal frequency generator is further caused to communicatively connect to the memory for providing a clock signal for the memory, and the memory periodically transmits the stored echo signal to the digital signal processor and the digital signal processor returns the processed and compressed echo signal to the upper computer for a view of user, and the memory associates the stored echo signal with a current time to improve the correlation between the stored echo signal and the well depth.

11. The main control system for a nuclear magnetic resonance logging while drilling tool according to claim 3, wherein a first input first output (FIFO) in the digital signal processor temporarily stores the echo signals.

12. The main control system for a nuclear magnetic resonance logging while drilling tool according to claim 6, wherein the RS485 serial bus adopts differential signal negative logic so as to realize point-to-point communication.

* * * * *